United States Patent [19]

Stengel

[11] Patent Number: 5,280,725
[45] Date of Patent: Jan. 25, 1994

[54] PROCESS AND DEVICE FOR NON-DESTRUCTIVE DETERMINATION OF THE PRESTRESSING CONDITION OF FERROMAGNETIC SECURING ELEMENTS

[76] Inventor: Wolfgang Stengel, Sailerstrasse 8, D-8000 Muenchen 40, Fed. Rep. of Germany

[21] Appl. No.: 836,324
[22] PCT Filed: Sep. 4, 1990
[86] PCT No.: PCT/EP90/01482
    § 371 Date: Mar. 4, 1992
    § 102(e) Date: Mar. 4, 1992
[87] PCT Pub. No.: WO91/03717
    PCT Pub. Date: Mar. 21, 1991

[30] Foreign Application Priority Data

Sep. 5, 1989 [CH] Switzerland .......... 3221/89

[51] Int. Cl.⁵ ........................... G01N 27/72
[52] U.S. Cl. ........................... 73/761; 73/779; 324/209
[58] Field of Search .......... 73/761, 779; 324/209

[56] References Cited

FOREIGN PATENT DOCUMENTS

| 3544920 | 6/1987 | Fed. Rep. of Germany | 73/761 |
| 1497834 | 10/1966 | France | 73/761 |
| 111442 | 7/1982 | Japan | 324/209 |

Primary Examiner—Jerry W. Myracle
Attorney, Agent, or Firm—Dennison, Meserole, Pollack & Scheiner

[57] ABSTRACT

The process described enables in situ testing of securing elements, for example bolted assemblies, to verify that their tightness is adequate and to detect any material defects. To this end, it is sufficient that a coil (19) subjects at least one part of the screwed assembly to an alternating magnetic field. This field, whose frequency can be varied, provides a spectrum containing information about the tightness of the assembly.

26 Claims, 7 Drawing Sheets

Fig. 7a
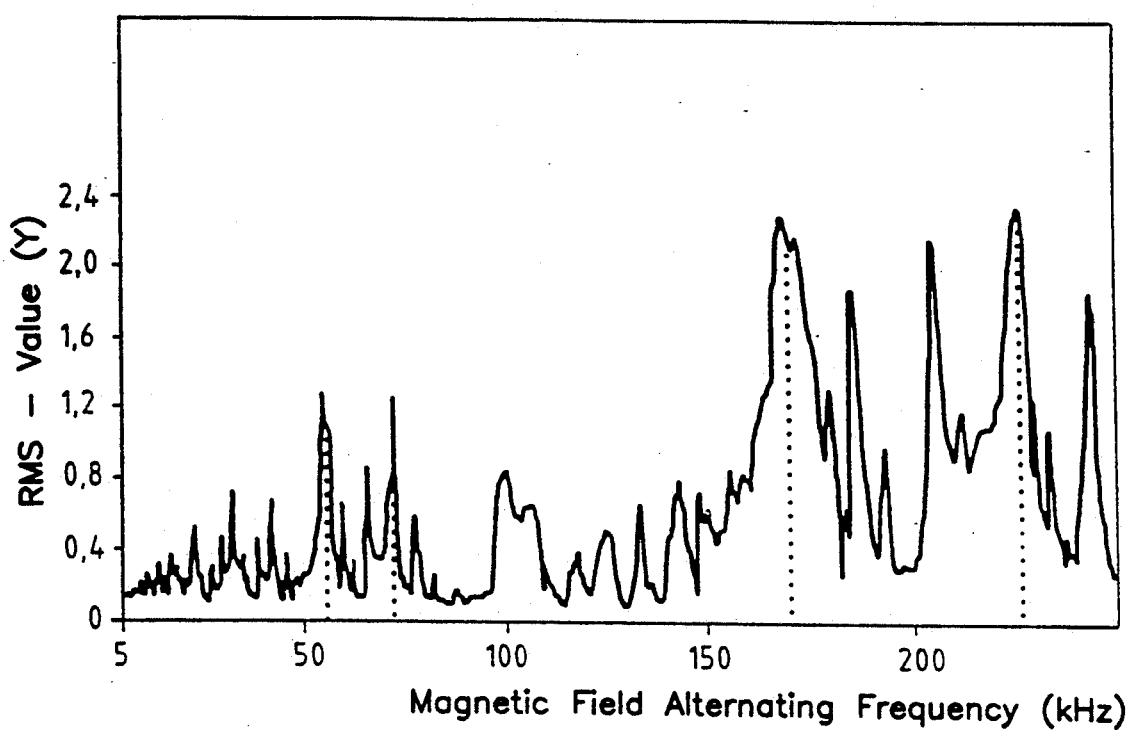
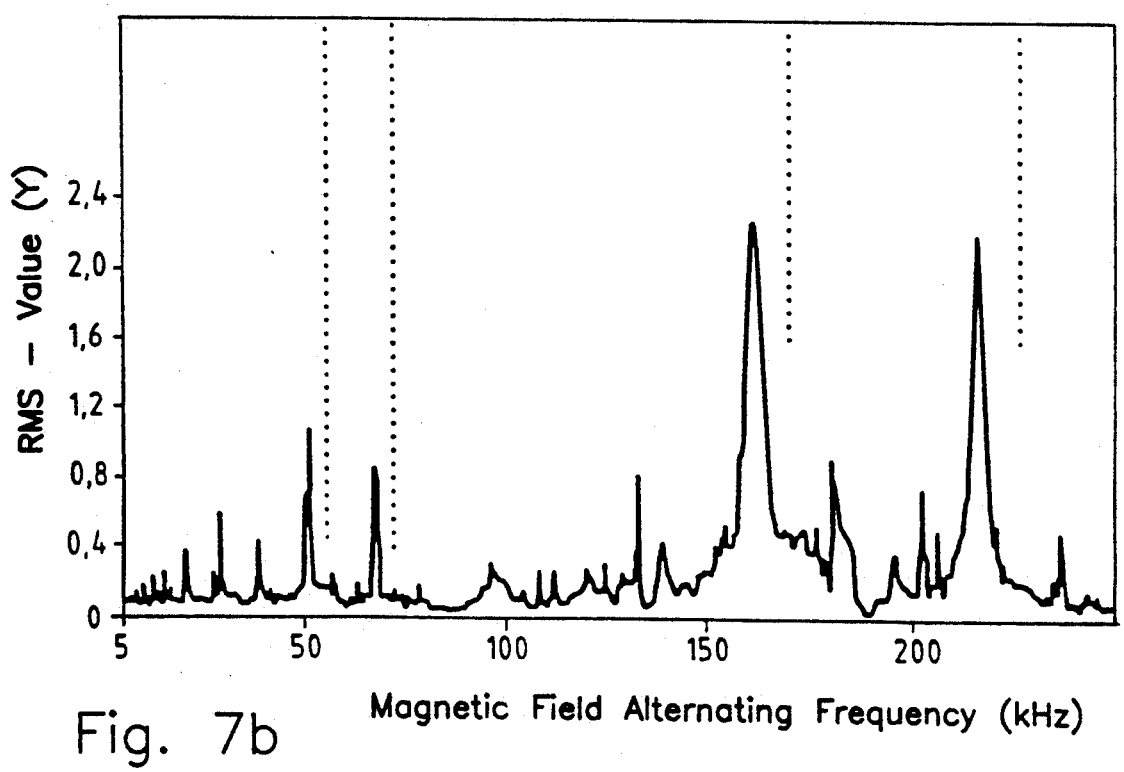
Fig. 7b

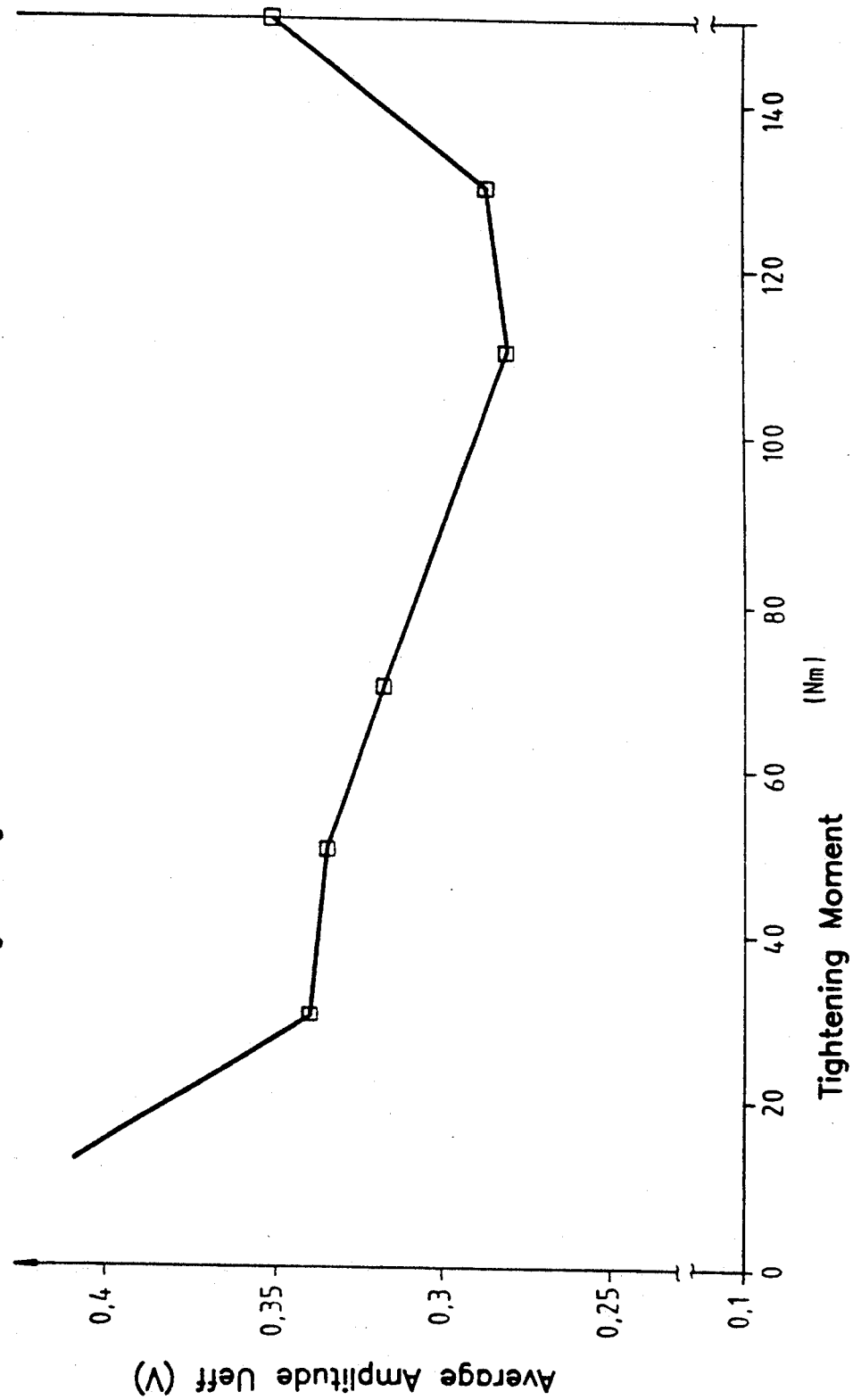

PROCESS AND DEVICE FOR NON-DESTRUCTIVE DETERMINATION OF THE PRESTRESSING CONDITION OF FERROMAGNETIC SECURING ELEMENTS

BACKGROUND OF THE INVENTION

Field of the Invention

The invention relates to a process for the non-destructive determination of the stressing condition of ferromagnetic securing elements, in which process an alternating magnetic field is applied to said elements and the magneto-mechanical acoustic emission thereof is detected and evaluated.

Determining the stressing condition which occurs in a securing element at its site of use is a topical problem of vast significance. Its significance resides above all in the aspect of safety. However, the economic aspect of this problem is not to be underestimated, either. In this context, it may also be pointed out that all over the world, product liability has been playing an ever-increasing part.

What is especially significant is the determination of the stressing conditions prevailing in screwed connections. Whenever parts are to be detachably connected, this is as a rule done by means of screwed connections. In a motorvehicle, for example, about two to three thousand screwed connections can be found. Of these, about three hundred are crucial for safety. For this reason, these screws or bolts have to be tightened particularly carefully, i.e. nether too loosely nor too strongly (cf. "Industrieanzeiger" 13/1988, pp. 24 through 27).

When a screw or bolt is tightened, the ultimately decisive factor is the tension force. It is the tension force alone which decides on how tightly the parts are to be detachably connected. At present, the man skilled in the art does not disposed of any direct methods for measuring this force; he can merely conclude from indices or auxiliary magnitudes, namely the torque or the pivoting angle or a combination of the two. Furthermore, the yield point may also be considered to be an auxiliary magnitude in a certain sense.

When a screw or bolt is tightened under torque control, it must be taken into account that sixty to ninety per cent of the torque are required as friction under the screw or bolt head and in the thread. It is therefore the remaining ten to forty per cent of the torque alone which effect a strain on the screw or bolt. This strain on the screw or bolt alone causes the desired tension force. Under different friction conditions and with constant tightening moment, the tension force can vary up to a hundred per cent in the extreme case. For verifying the tension force of a screwed connection, detecting the torque thus remains merely a makeshift measuring solution. Deviations from the required tension force in screwed connections can be reduced by the use of a tightening process which is controlled by both the torque and the pivoting angle. In this process, however, the expenditure for electronic controlling and measuring equipment is far higher than with torque-controlled tightening. In a tightening process which is controlled by the torque/pivoting angle, the screw or bolt is turned in until a plastic deformation occurs, from which point onwards the screw or bolt is tightened by a predetermined angle. Since the strain of the screw or bolt can be determined from the pivoting angle and the pitch of the thread, the tension force of the screw or bolt may be calculated, taking into account the elastic modulus of the screw/bolt material. Irrespective of the friction conditions, this yield point-controlled tightening process provides the best indirect indications about the pre-stressing force of a screwed connection.

As a rule, it would be ideal for determining the prestressing force if the parameters stress and strain could be measured directly during the tightening of the screw or bolt. In production, however, when conventional tightening processes were used, it has so far been impossible to measure these parameters ("Industrieanzeiger" 16/1988, pp 21 through 24).

German patent application DE-AS 25 19 430 already discloses a measuring process for determining the axial force of screw bolts in which the screw bolts are excited to ultra-sonic resonance vibrations by means of transversal and longitudinal waves. The natural frequencies are thus dependent on the longitudinal modulus and the transversal modulus, resp. of the screw bolts. The axial forces to be measured are derived from shifts of the natural frequencies as a result of the strain of the sample body.

Moreover, German patent DE 33 33 285 A1 teaches means for detecting forces, stresses and accelerations in machines, devices and the like, in which a measuring value generator is built into a structural element under stress. The measuring value generator contains a low-Ohm resistance structural element. In screwed connections, the measuring value generator is built into the bolt or the washer.

Further, German patent DE 33 45 760 C2 discloses measuring means comprising a measuring spring made of ferromagnetic material, in which the deformation behaviour of an elastic spring of ferromagnetic material is examined by means of a strain measuring strip and a magnetic field which passes through the spring at the site of the strain measuring strip.

German patent DE 27 14 334 A1 teaches means for monitoring the tension force of a screwed connection, in which a tightly fitting measuring wire is wound around the periphery of the nut of a screwed connection for measuring the stress-related radial expansion. One end of the measuring wire is secured to the nut, the other end remaining tangentially movable on its periphery. After the prestressing force has been exerted on the nut, the latter expands radially, resulting in the measuring wire being displaced. This displacement is detected longitudinally and assigned to the prestressing force.

Furthermore, German utility model DE-GM 6608345 discloses a detecting element in the form of a washer which transforms the applied prestressing force into an electrical signal.

For detecting stresses in materials having ferromagnetic properties, magnetic measuring processes may be used. These involve, for example, recording the Barkhausen effect, measuring the permeability or multiple detecting of magnetic parameters. The physical causes of the stress susceptibility of ferromagnetic materials are based on magnetoelastic effects which, after material deformation or interior rearrangement processes, result in changes in the energy contributions determining the domain structure. These changes then influence the magnetic parameters.

German patent DE 34 04 232 relates to a process for examining material properties and material states of ferromagnetic materials on the basis of the magneto-mechanical acoustic emission of the ferromagnetic material in a magnetic field. In this process, the magneto-elastically induced emission of a standardized ferromagnetic sample and of the ferromagnetic material to be examined is recorded at a continuously varied frequency of the magnetic field and at a constant amplitude of the magnetising field strength of the alternating field, after which the acoustic emissions of the standardized ferromagnetic sample and the emissions emanating from the ferromagnetic material under test are then compared. In this process, a modifiable portion of a direct-current field is also intended to be superimposed on the alternating magnetic field. This modifiable portion of the direct-current field is used to adjust a certain point of the hysteresis curve for premagnetizing the sample or for demagnetising a previously magnetized sample.

It may further be gathered from a report of a meeting (W. Stengel: "Magnetoelastische Resonanzspektroskopie". Deutsche Gesellschaft für zerstörungsfreie Prüfung e.V. (German Society for non-destructive Testing), Berichtsband (Volume) 14, 1988, pp 638 through 645) that a sample which is subjected to a tensile force is subsequently found to have a characteristic magnetostrictive vibration behaviour in every area of the corresponding stress-strain diagram. Plastic deformation of the sample can be seen from a frequency shift of related resonance amplitudes. In this case, the magnetostrictive vibration was induced exclusively along the longitudinal measuring area of the tensile sample by means of a cylindrical coil surrounding the longitudinal measuring area. The acoustic emission behaviour thus can only be related to the tensile stress condition prevailing in this area.

SUMMARY OF THE INVENTION

Based on this prior art, it is the object of the invention to provide a process and a device by means of which the stress condition and the strain of a ferromagnetic connecting element, e.g. a screwed connection, may be determined during or after tightening, regardless of the friction conditions prevailing.

This object is accomplished according to the invention by a process for the non-destructive determination of the stressing condition of ferromagnetic connecting elements, in particular built-in connecting elements, in which an alternating magnetic field is applied to the connecting element, the resulting magnetostrictive or acoustic vibrations are detected and the signal obtained is evaluated.

The process characterized in that a variable D.C. magnetic field is superimposed on the alternating magnetic field.

The process characterized in that the D.C. magnetic field is modulated in a quasi static manner such that its variable strength, starting from an initial value, is varied cyclically between two field strength values.

The process characterized in that the frequency of the alternating magnetic field is varied and that a magneto-mechanical acoustic vibration spectrum is detected as a function of the frequency.

The process characterized in that the vibration spectrum obtained during testing the connecting element is compared with a vibration spectrum assigned to a stress-strain curve in order to obtain a measuring result for the stressing condition.

The process characterized in that reference values are determined from a standardized element, which reference values are then used for creating reference values in the stress-strain curve, the vibration spectrum produced during the test of the connecting element being related to these reference magnitudes in order to obtain a measuring result for the stressing condition.

The process characterized in that a numerical value is determined which is in a functional relation to the area under the determined vibration spectrum and which is assigned a point on the stress-strain curve.

The process characterized in that a numerical value is determined which is in functional relation with the area of the magnetostrictive hysteresis curve and which is assigned a point on the stress-strain curve.

The process characterized in that an output signal obtained after evaluation is fed into display means for displaying the measured value or is used for controlling screw means.

The process characterized in that the frequency shift of individual lines of a spectrum is measured in comparison with a reference spectrum and obtained as a measure for the strain of a connecting element.

The process characterized in that the amplitude change of individual lines of the spectrum is measured in comparison with a reference spectrum and obtained as a measure for the stress in the connecting element.

The process characterized in that the stress-strain curve is obtained by connecting the measured values of the frequency shift and the amplitude change.

When a screwed connection is tightened, a multi-axial tension condition builds up in the screw or bolt. A tensile stress is thereby exerted on the area of the clamped length of the screw or bolt. The parts connected and tightened by the screw or bolt are thus under compressive stress. The compression stresses in the screwed components are not limited exclusively to the area directly under the screw/bolt head, but at $L_K = 8d$ even extend to up to $D_B = 3D_k$ along the clamped length $L_K$, if the dimensions of the components permit this, as can be seen from FIG. 2 and 3. $D_K$ is the head or nut contact diameter. High notch stresses are to be expected in the transient range from shaft to head and in the area of the thread. In the screw/bolt head tensile and compression stresses occur simultaneously. In nut and bolt connections, the nut is predominantly under compression stress (Decker, Karl-Heinz: "Maschinenelemente, Gestaltung und Berechnung", 8th ed., Edits. Hanser-Verlag, 1982, p. 142).

In ferromagnetic materials, the formation of the structure of the magnetic area (Weiss' domains) is influenced both by stresses in the interior of the material and by mechanical stresses affecting the material from the outside. According to theoretical reflections (Charles Kittel: "Physical Theory of Ferromagnetic Domains", in "Reviews of Modern Physics", Vol. 21, NO. 4 (1949), pp 541 through 583) the array of the magnetic domains can be roughly described, taking four energy contributions into account. The structure is formed under the condition that the sum of the energies taking part therein becomes minimal. The magnetostrictive behaviour of a ferromagnetic material, i.e. its change of shape in the presence of a magnetic field, is thus substantially determined by the magneto-elastic energy contribution which, for isotropic solids, depends on the magnetostriction constants and the magnitude of the mechanical stresses. The magnetostriction constant characterizes the average spontaneous grid distortion which occurs at the same time as the spontaneous magnetisation within the magnetic domains (Reviews of Modern Physics, vol. 21, no. 4, October 1949, pp. 541, 583).

Therefore, if a material having magnetic properties is exposed to mechanical stresses from the exterior, it is not only the material's magnetostrictive behaviour which changes but also other stress-dependent magnetic magnitudes, such as its permeability or the magnetic induction depending thereon. Thus, as shown in FIG. 1, materials having positive magnetostriction generally show an increase of their permeability and induction values when exposed to mechanical tensile stresses increasing to the elastic yield point of the material. On the other hand, permeability and consequently also induction decrease with stresses leading to strains above the elastic yield point, as set out in R. M. Bozorth: "Ferromagnetism", D. Van Nostrand Company, Inc., New York, 1955, pp. 595–599.

It may thus be assumed that a screwed connection mounted in its final position will feature a magnetic domain structure in the areas influenced by the stresses, which structure is determined amongst others by the prevailing stress condition. If thus an external magnetic field is locally directed to the stress-affected areas and the magnetostrictive behaviour is detected, then this measurement indirectly also detects the stresses prevailing at this site. This is the case because the magnetostrictive behaviour is directly dependent on the prevailing stresses.

The invention is based on the novel finding that the prestressing condition characteristic of the clamping force of a connecting element, e.g. a screwed connection, can also be tested after it has been assembled and installed at its site of use, provided that the external magnetic field only reaches (at least) a partial area of the connection which is exposed to the stress condition created by the connection. In a screwed connection, it is thus sufficient only to detect a partial area interspersed with stress lines, even if the stress condition prevailing there is different as compared to the stress condition prevailing in the shaft area of interest. The fact that the force flux or the course of the stress lines is concentrated in the area of the connecting element and closed in itself, the stress conditions prevailing in different partial areas are in their effects directly related to those in the shaft area.

It has thus been found that e.g. in the case of a screwed connection, it is not absolutely necessary that also the shaft of the screw or bolt be affected by the external magnetic field, but that it is sufficient if an accessible part of the screwed connection, e.g. the screw/bolt head is acted upon by the magnetic field. The present invention therefore provides a novel process which makes it possible, even if the shaft itself is inaccessible, to determine the stress in the shaft which is important for the safety of the connection.

The invention also relates to a device for performing the process. The device is characterized by the the non-destructive determination of a stressing condition of ferromagnetic connecting elements, in particular of built-in connecting elements, with an A.C. generator (21) of variable frequency, a coil (19) connected with the a.C. generator (21) for generating a magnetic field in at least part of the connecting element (13), an acoustic-electric sensor (23) abutable to the connecting element (13) and signal processing and control means (25).

The device characterized by a D.C. generator (22) connected with the coil (19) for generating a D.C. magnetic field.

The device characterized by a D.C. field coil (20) for generating a magnetic field in at least part of the connecting element (13), the D.C. field coil (20) being connected with a D.C. generator (22).

The device characterized in that display means (27) for displaying the stressing condition in the connecting element (13) is connected with the evaluating circuit (25).

The device characterized in that screw means (28) is connected with the evaluating circuit (25).

The device characterized in that the coil (19 or 20) and the sensor (23) are arranged practically concentrically to each other.

The device characterized in that the sensor (23) is mounted on a coupling element (26).

The device characterized in that the coil (19 or 20) is disposed within the coupling element (26).

The device characterized in that it is provided in the form of a rod-like hand device having a head (33) in which the coils (19 or 20) and the sensor (23) are accommodated.

The device characterized in that the sensor (23) can be displayed axially in the head (33) against the force of a spring (37).

The device characterized in that the alternating field coil (19) and the D.C. field coil (20) are essentially arranged concentrically to each other.

The device characterized in that the D.C. field coil (20) is disposed essentially perpendicularly to the alternating field coil (19).

The device characterized in that the D.C. field coil (20) is disposed on a coupling element (26), which coupling element (26) on the one hand transfers the measuring signals from the excitation site to the sensor (23) and on the other feeds the D.C. field flux into the connecting element (13) to be tested.

The device characterized in that the coils (19, 20) are integrated in an automatic hand device.

BRIEF DESCRIPTION OF THE DRAWINGS

The invention is further explained with reference to the drawings.

FIG. 7a shows vibration spectrograms during measurement of a structural component before stressing, FIG. 7b shows vibration spectrograms during measurement of a structural component after stressing thereof, FIG. 8 (including parts 8a–8e) shows the areas A, B, C and D of a stress-strain diagram.

DESCRIPTION OF THE INVENTION

Figure 1:
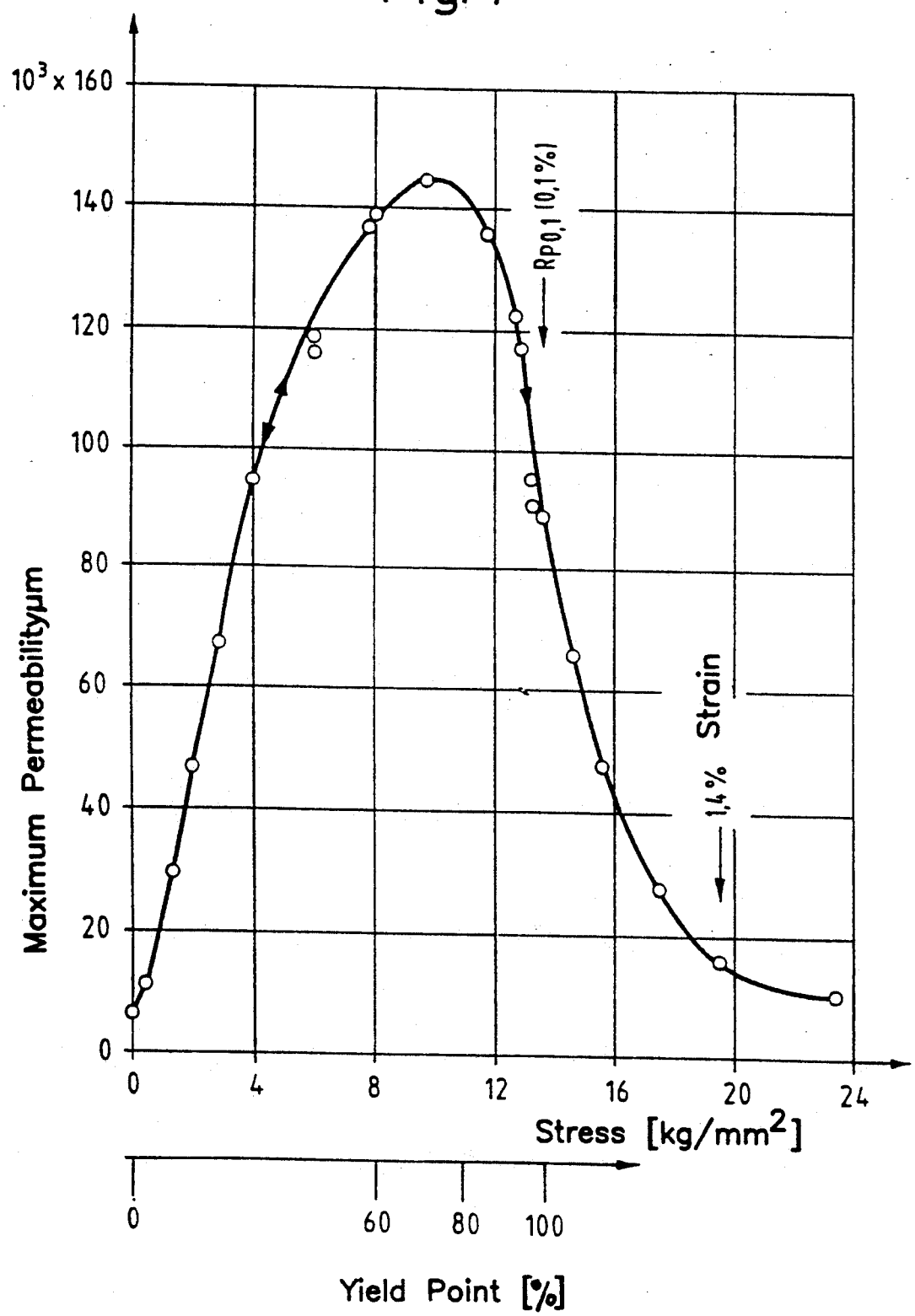
FIG. 1 is a diagram indicating the course of the permeability as a function of an external tensile stress

FIG. 1 shows the above-mentioned influence of a mechanical tensile stress on the maximum magnetic permeability in a material having magnetostrictively positive properties.

Figure 2:
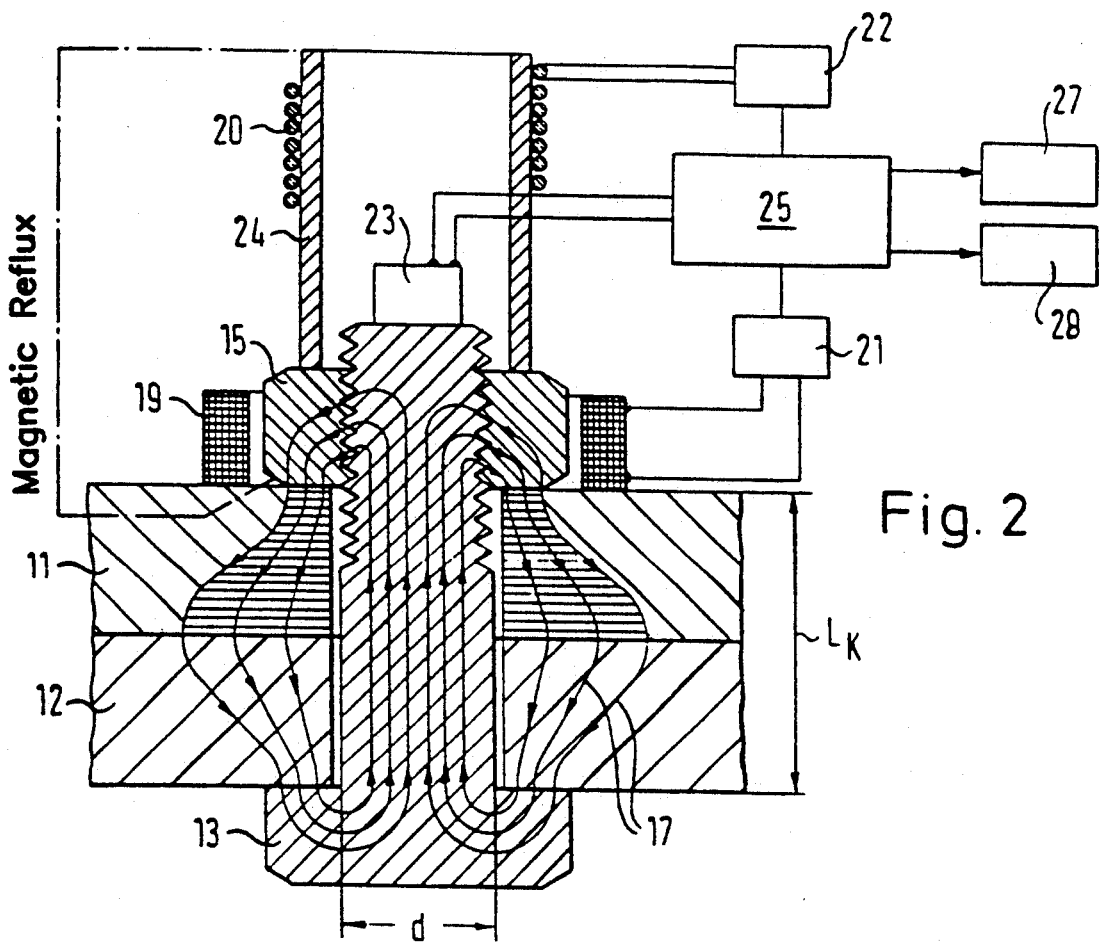
FIG. 2 shows the force flux in a screwed connection, at the same time schematically illustrating the device for performing the process.

FIG. 2 shows a screwed connection which connects parts 11 and 12 by means of bolt 13 and nut 15. Reference numeral 17 indicates the stress lines.

The schematically illustrated device for performing the process according to the invention comprises a coil 19 connected to an A.C. generator 21, which generator in turn is controlled by a signal processing and control means 25. The frequency of this A.C. generator 21 can be varied in a range of approx. 0.1 kHz to up to about 1 MHz. A piezo-electric sensor 23 is coupled to an accessible part of the bolt 13. This sensor 23 is connected to a signal processing and control means 25. The control means 25 supplies signals to display means 27 and/or screw means 28. The measuring device illustrated can thus also be used for terminating the tightening procedure after a certain stress condition has been reached.

Figure 3:
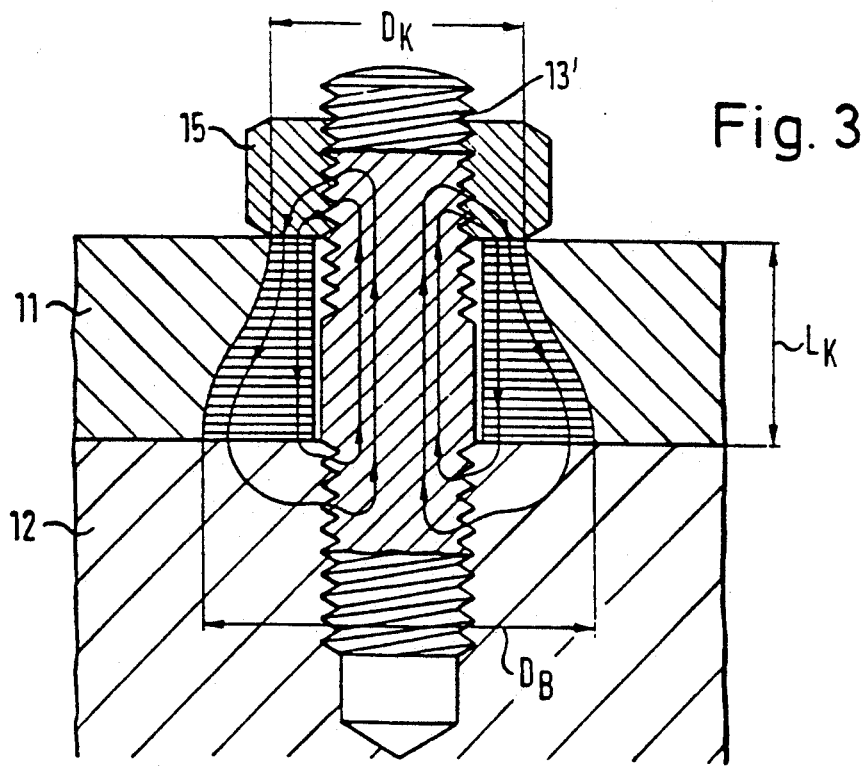
FIG. 3 shows the force flux in a screwed connection with a stud.

The process according to the invention is suited for examining various kinds of screwed connections, for instance also a connection with stud 13', as is shown in FIG. 3. Basically, however, other kinds of connecting elements which are exposed to a stress at their site of use can be tested in this manner.

Figure 4:
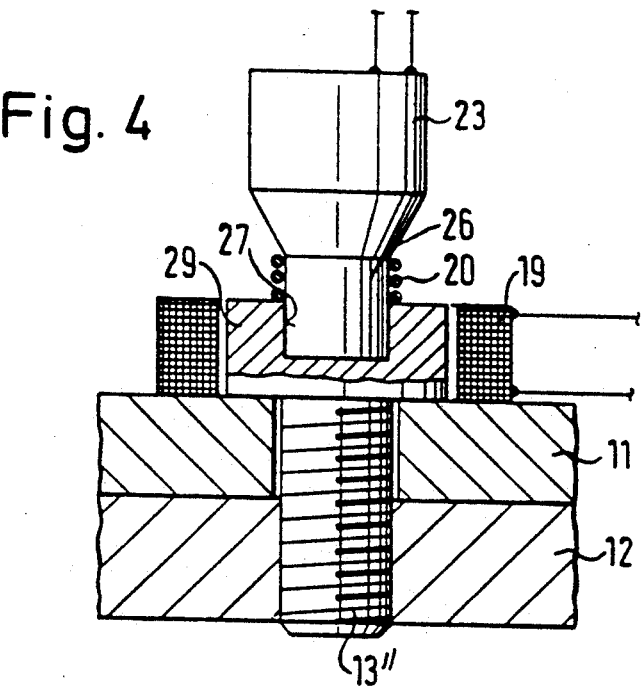
FIG. 4 is a schematic illustration of a coil and sensor for performing measurements in a hexagon socket screw.

FIG. 4 shows a screwed connection with a hexagonal socket screw 13". Hexagon socket screws of this kind are also referred to as Allen screws. Again, a coil 19 is shown which is capable of applying an alternating magnetic field to at least one voltage-carrying part of the hexagon socket screw 13". The sensor 23 is in contact with the screw 13' via the coupling element 26, which is accommodated in the hexagon socket opening 27 of the hexagon socket screw head 29.

Figure 5:
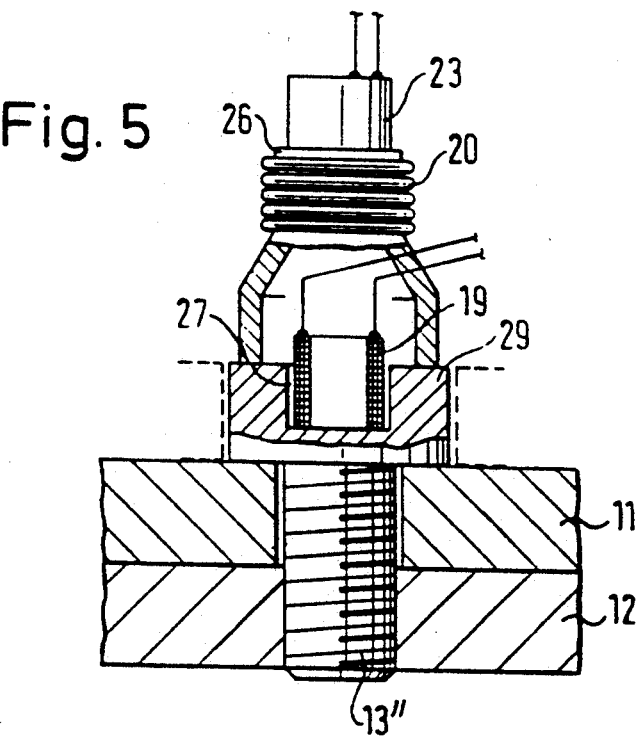
FIG. 5 is a schematic illustration of coil and sensor during measurement of a hexagon socket screw.
Figure 6:
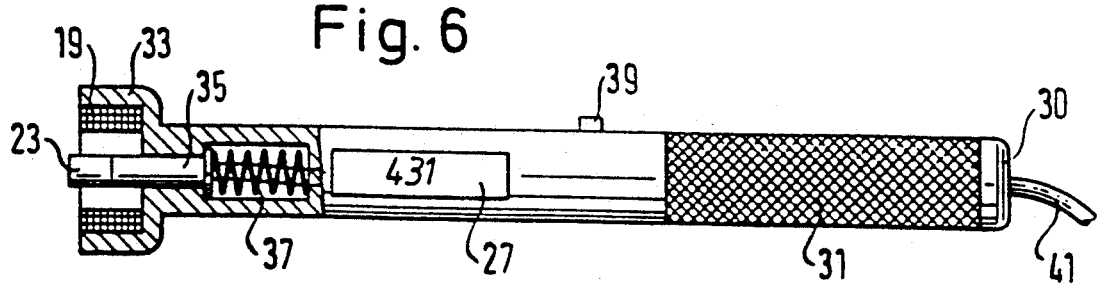
FIG. 6 is a schematic illustration of an embodiment example in the form of a hand device for non-destructive measurement of the stress condition in a connecting element.
Figure 8D:
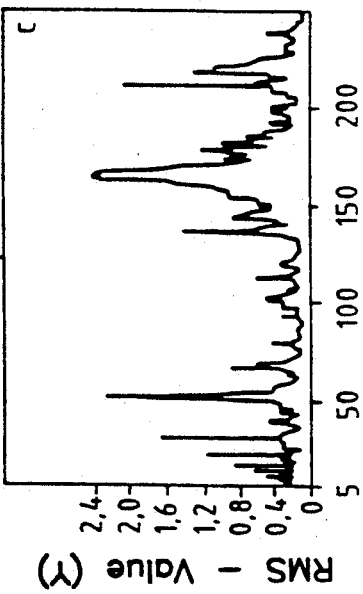
FIG. 8d shows a stress-strain diagram corresponding to area C.
Figure 8E:
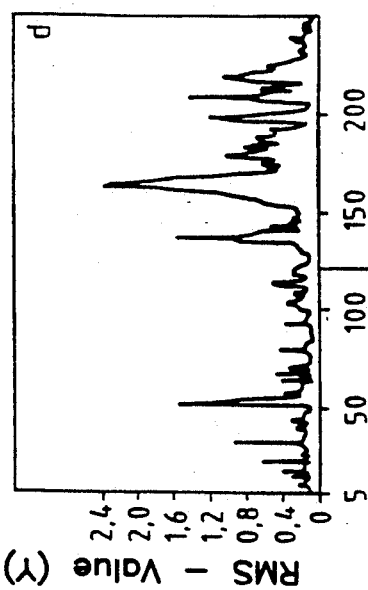
FIG. 8e shows a stress-strain diagram corresponding to area D, FIG. 9 indicates measuring results obtained during testing of a screwed connection, in which the prestressing condition of the screw/bolt was increased by changing the tightening moment.
Figure 8A:
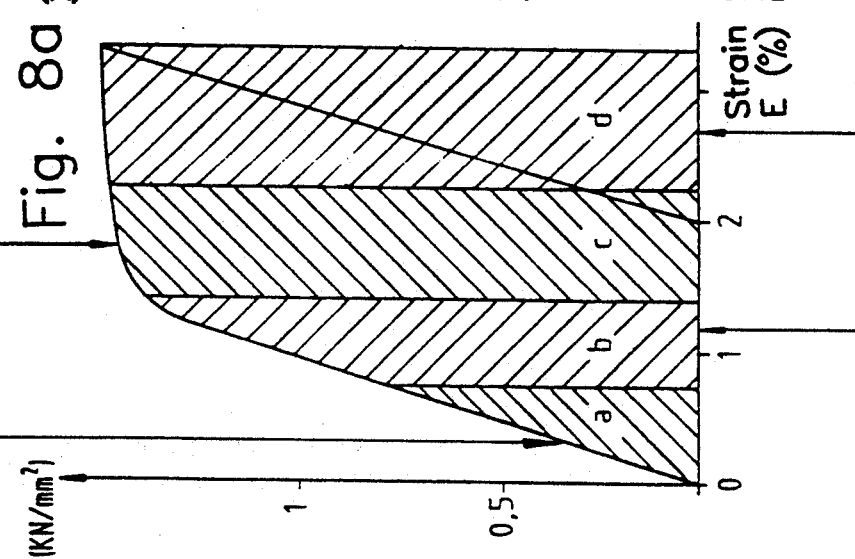
FIG. 8b shows a stress-strain diagram corresponding to area A.
FIG. 8c shows a stress-strain diagram corresponding to area B.
Figure 8B:
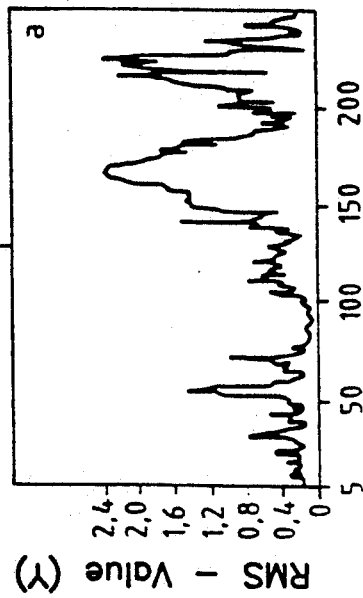
Figure 8C:
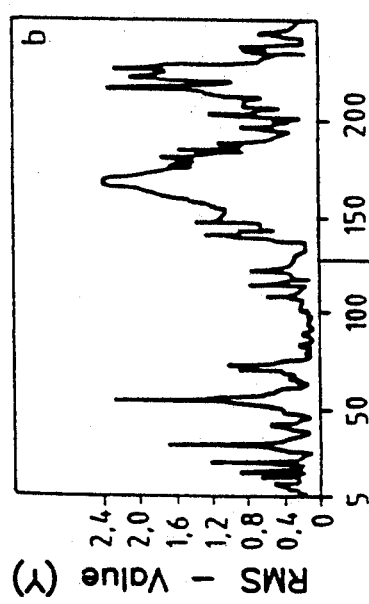

As is shown in FIG. 5, it is also possible to accommodate coil 19 in the hexagon socket opening 27. Again the sensor 23 is in mechanical contact with the screw head 29 via a coupling element 26. There are various possible practical embodiments of the measuring device schematically illustrated above. FIG. 6 for example shows a rod-like hand device 30 having a handle 31 and display means 27. The head 33 of the device 30 holds the coil 19 and the sensor 23. Sensor 23 is mounted on a shaft 35 which in rest position is held in the indicated position by a spring 37. If the head 33 is put over a screw or bolt head, a nut or a part of a different connecting element, then the sensor 23 rests on the connecting element. Actuation of the press head 39 starts the measuring process, the result of which can then be read from display means 27. The current source, the frequency generator and the evaluation circuit, if made small enough, can be accommodated inside the hand device 30. Otherwise, they can be connected by means of a cable 41.

It is desirable, but not absolutely necessary, that the sensor 23 be in contact with the connecting element 13. Since sound waves propagate well in metals, the sensor 23 could for example also be put onto the workpiece 11. If desired, it is also possible not to mount the exciting coil and/or the sensor in the manner of the illustrated examples, but for instance rather dispose them laterally on the accessible part of the connecting element. Deviating from the figures illustrated, coil configurations are thus possible in which the alternating magnetic field acts unsymmetrically with regard to the part of the connecting element or the stress field.

The process and the device can also be used for testing connecting elements, in which the individual parts forming the connection do not exclusively have ferromagnetic properties. In the case of a screwed connection for example, it will suffice if either the nut or the screw bolt is ferromagnetic and at the same time exposed to the stress field of the connection.

FIG. 7 (including parts 7a and 7b) shows the changes occurring in the amplitude spectrum of a sample if the latter is strained. Before e.g. a screw or a bolt is tightened and forces as shown in FIG. 2 are at work, an amplitude spectrum is obtained, as is exemplarily shown in the top picture of FIG. 7. If a stress is exerted which leads to a plastic deformation, then a spectrum is obtained, as can be seen exemplarily in the lower picture of FIG. 7. The spectrum obtained is comparatively little structured but still has sharply formed resonance points. A comparison with the top picture shows that a frequency shift has occurred.

As a rule, it can thus be concluded that a frequency shift is indicative of the strain and an amplitude change is indicative of the stress prevailing in the material of the individual part. The evaluation of the various spectra makes two things possible. On the one hand, a stress-strain diagram can be drawn up for the material of the structural component. On the other, the stress condition of a structural component can be determined, i.e. at which point in the stress-strain diagram it is.

FIG. 8 (including parts 8a–8e) shows the interrelation of the changing spectrograms a, b, c, d with the stress-strain diagram. Immediately after a tensile stress has occurred, the resonance behaviour changes markedly as compared to the initial spectrum as shown in the top part of FIG. 7. What is particularly conspicuous here is that spectra corresponding to the linear-elastic range of the stress-strain diagram differ strongly from those corresponding to the plastic deformation range of the stress-strain diagram. The transition from the elastic to the plastic deformation range is marked by sharp and less structured resonances. This change in the amplitude spectrum is already perceptible in spectrum b.

FIG. 8 merely shows (as FIGS. 8b–8d, respectively) four spectra a, b, c, d, as are typical of the corresponding areas a, b, c and d of the stress-strain diagram. In reality, a different spectrum is obtained for each point of the stress-strain curve. Thus, if the stress-strain diagram of the respective material of a component is known, then it may be determined from the corresponding spectrogram which point in the stress strain curve was reached by tightening the connecting element. The point in the stress-strain curve can be determined for instance by calculating the area under the spectrum curve and concluding therefrom the corresponding point in the stress-strain curve.

FIG. 9 shows measuring results obtained in testing a screwed connection in which the prestressing of the screw or bolt was increased by varying the tightening moment. The magnetostrictive vibration for determining the prestressing condition is thereby induced by an A.C. field coil surrounding the nut of the screwed connection, as is schematically shown in FIG. 2. By evaluating the vibration spectra determined for each tightening moment with regard to the average amplitude value, which is proportional to the area under the spectrum curve, it can be concluded that—as a function of the tightening moment—the average magnetostrictive vibration amplitude first decreases with increasing tightening moment, then passes a minimum and subsequently increases again. It is to be pointed out here that it is frequently advantageous when relative amplitude changes are taken into account in the evaluation. The term "relative amplitude changes" is understood to be the change of e.g. the average amplitude relative to the average amplitude of a starting condition. The evaluation of relative signal changes is particularly advantageous when the sensor 23 is for instance placed upon the workpiece 11.

When built-in standardized connecting elements are to be tested, the stress-strain curve and the corresponding magnetostrictive vibration spectrograms of a standardized connecting element serving as a sample may first be determined. It must be taken into account here that for obtaining the spectrograms, the coil and sensor must be disposed relative to each other on an accessible part of the connecting element in the same manner as will be the case in the built-in standardized connecting element. The corresponding data is then available in a memory of the evaluating circuit as reference values for measuring. When the respective built-in standardized connecting element is tested, the signal output by the sensor is compared with the stored values of the stress-strain curve in order to provide a measuring result for the stressing condition.

It is also possible to determine reference values of a standardized connecting element, to use these for creating reference magnitudes in the stress-strain curve and to transform them into a computing program. This computing program is then used for example by a microprocessor in the signal processing means in order to relate the signal produced during testing of the built-in connecting element to the said reference magnitudes so as to obtain a measuring result for the stressing condition.

In a further embodiment of the process according to the invention, a D.C. magnetic field, the strength of which is variable on a quasi static basis, is superimposed on the alternating magnetic field, the frequency of which is continuously varied. This results in a premagnetisation of the range of the connecting element which is magnetostructively excited by the alternating magnetic field. Owing to this measure, the magnetic domain structure in this domain is determined both by the mechanical stresses prevailing and by the direction and strength of the quasi static D.C. magnetic field. Thus the magnetic field is quasi statically modulated such that its variable strength—for example starting from field strength 0—assumes values which are cyclically varied between two field strength values so that hysteresis appearances of the measuring magnitude can be registered as a function of the variable D.C. field strength with the parameter of the prevailing stress condition. Magnetic hysteresis appearances occur in all ferromagnetic materials, in particular in those materials which are used for connecting elements.

As shown in FIG. 2, the D.C. magnetic field is thereby produced by means of a D.C. field coil 20 wound on a hollow cylindrical ferromagnetic core 24. The D.C. field coil 20 is supplied with variable direct current by a bipolar power supply 22 which is controlled by control and evaluating means 25. Due to the fact that one of the open ends of the hollow cylindrical core 24 rests directly on the nut 15, the D.C. magnetic field extending in the core 24 is continued in the nut, thus superimposing the alternating field produced by the coil 19.

The D.C. magnetic field, however, can also be led into the structural component under stress via a ferromagnetic coupling element 26, as is shown in FIG. 4 and 5, by disposing the D.C. field coil 20 on the coupling element 26. The coupling element 26 then has two functions, namely, on the one hand, transferring the measuring signals from the excitation site to the sensor 23, and, on the other, guiding the D.C. field flux into the connecting element to be tested. It is also possible to superimpose a variable D.C. field portion onto the A.C. field coil 19 so that only one coil is required for the D.C. and A.C. magnetic fields.

Figure 10:
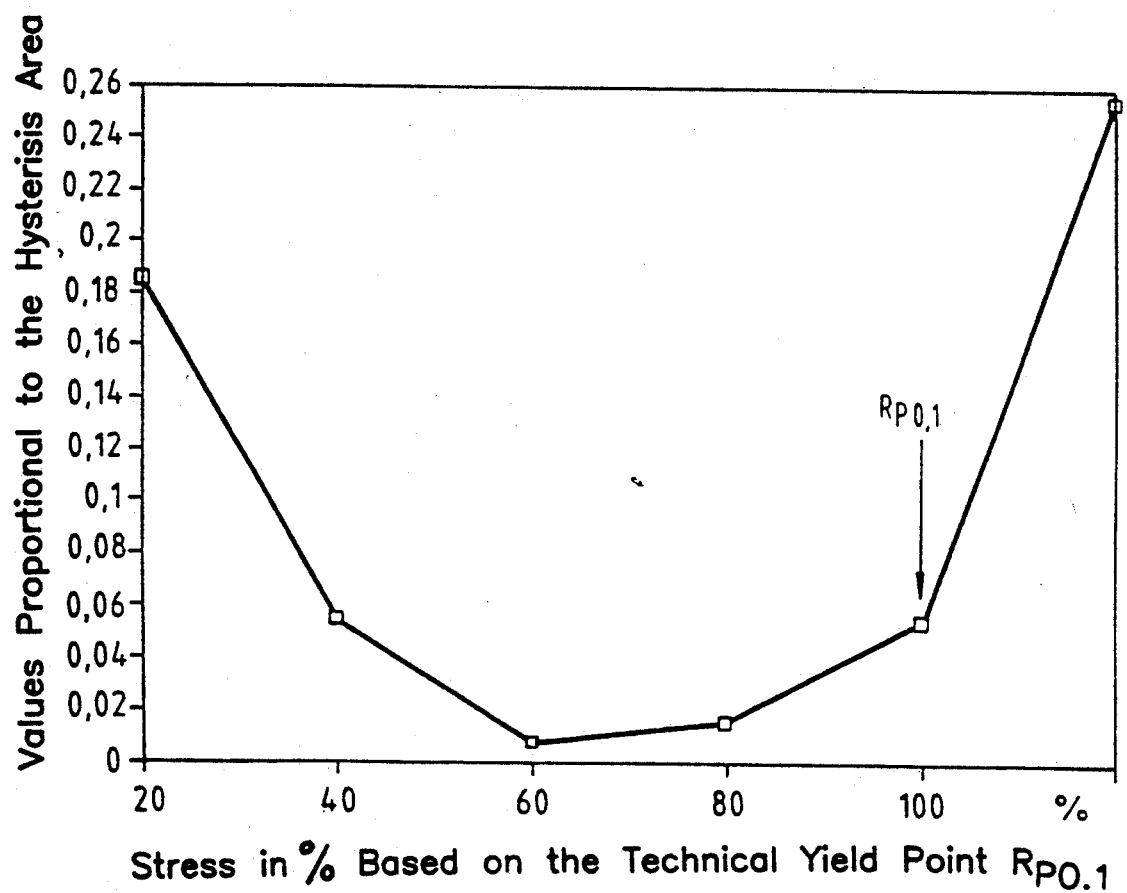
FIG. 10 illustrates measuring results of several corresponding screwed connections as in FIG. 9, said screwed connections each having a different prestressing condition

FIG. 10 shows the measuring results obtained in testing several corresponding screwed connections under individually different but defined prestressing conditions. The test is conducted as described in FIG. 9, using a varying D.C. magnetic field which has an additional axial effect on the nut.

It goes without saying that the maximum magnetizing field strength need at the most reach the value of the saturating field strength of the material to be tested. In comparative tests, however, it must be ensured that the field strength is modulated in the same manner every time. An evaluation of the dependence of the variable D.C. field strength and the vibration spectra detected as a function of the stressing condition prevailing in the nut shows that a magnetostrictive hysteresis behaviour of the amplitudes is obtained which is dependent on the stressing condition. The ordinate values of the diagram in FIG. 10 are hereby formed by values which are proportional to the area including the magnetostrictive hysteresis loop. Depending on the prestressing of the screw or bolt, a parabolic curve of the hysteresis values is obtained having its minimum at stresses below the technical yield point $R_{p0,1}$. This means that stresses above or below the hysteresis minimum have more marked magnetostrictive hysteresis appearances. In the minimum, the amplitudes of the vibration spectra obtained during cyclic modulation of the D.C. field only show minor variations, which results in a small hysteresis area.

The screw prestressing range in FIG. 10 relative to the technical yield point $R_{,1}$ corresponds to the respective stressing area of the diagram in FIG. 1 which diagram shows the dependence of the maximum magnetic permeability on the stress. Since the screwed connection also has magnetostrictively positive properties, the hysteresis minimum found in FIG. 10 can be related to the permeability maximum of FIG. 1.

The latter also occurs below the technical yield point $R_{p0,1}$ and is, as described in Bozorth, at the elastic yield point.

In contrast to all known methods, the test process according to the invention thus for the first time also provides a simple, easily feasible way of very accurately determining the elastic yield point. It is pointed out in particular that this material parameter is determined on the basis of signals which are actively provided by the material itself and are caused by submicroscopical processes in the interior of the material. Length and force measurements with their potential inaccuracies as used in conventional methods are not required here.

It is thus possible by means of the measuring process according to the invention to accurately and definedly adjust the prestress, oriented at the elastic yield point. In particular, it is not necessary to know the accurate numerical value of the mechanical material parameters beforehand, since the yield point becomes perceptible in the inventive test process in the magnetostrictive hysteresis values becoming minimal during tightening of the screwed connection. Consequently, substantially increased safety of assembled screwed connections, without major friction losses, is obtained.

When built-in connecting elements are tested, it is likewise possible to clearly identify the prevailing stress condition. This can be carried out by first determining the stress-strain curve of a standardized structural component serving as a sample and then the related magnetostrictive hysteresis behaviour which is functionally dependent on the stress. The corresponding data is then available in a memory of the evaluating means as reference values for measuring. For determining whether the prestress is above or below the elastic yield point, either the appearance form of the hysteresis loop or the magnetostrictive vibration spectrum can be considered, both of which are of a clearly different form below the elastic yield point than above this point. As an example thereof, reference is made to FIG. 8, the partial pictures a, b of which illustrate vibration spectra below and the partial pictures c,d illustrate vibration spectra above the yield point.

In a further embodiment of the process according to the invention, the aforementioned hysteresis behaviour is determined without a superimposed D.C. field, in that the amplitude of the alternating magnetic field, the frequency of which is continuously varied, is cyclically varied step by step between a low and a high amplitude value in such a manner that after termination of the cycle, the amplitude of the alternating field is at its original value again. Between the amplitude increasing steps, the alternating frequency of the magnetic field is adjusted. It goes without saying that the maximum alternating field amplitude need only assume such values as are required for magnetic saturation of the connecting element to be tested.

This approach has the advantage that only one coil is needed for determining the hysteresis behaviour and that no D.C. power supply is required. The process for testing connecting elements is as described for testing by means of a superimposed D.C. field.

It is additionally pointed out that the inventive process for the non-destructive determination of the prestressing condition of ferromagnetic connecting elements is also suited for materials having magnetostrictively negative properties.

I claim:

1. Process for non-destructive determination of a stressing condition of a selected ferromagnetic connecting element wherein said process comprises the steps of:
    applying an alternating magnetic field to the connecting element,
    detecting any magnetostrictive or acoustic vibrations resulting from the application of the alternating magnetic field on the connecting element,
    obtaining a signal representative of the resulting magnetostrictive or acoustic vibrations detected from application of the alternating magnetic field on the connecting element, and
    evaluating the obtained signal resulting from the magnetostrictive or acoustic vibrations to determine the stressing condition of the ferromagnetic connecting element.

2. Process according to claim 1, further comprising the steps of:
    superimposing a variable D.C. magnetic field on the alternating magnetic field.

3. Process according to claim 1, further comprising the step of:
    modulating the D.C. magnetic field in a quasi static manner such that its variable strength, starting from an initial value, is varied cyclically between two field strength values.

4. Process according to claim 3, including the steps of:
    varying the frequency of the alternating magnetic field; and
    detecting a magneto-mechanical acoustic vibration spectrum as a function of the frequency.

5. Process according to claim 4, wherein the step of obtaining the vibration spectrum during testing the connecting element includes comparing with a vibration spectrum assigned to a stress-stain curve in order to obtain a measuring result for the stressing condition.

6. Process according to claim 4, including the steps of:
    determining reference values from a standardized connecting element,
    using the reference values for creating reference values in the stress-strain curve, and
    producing the vibration spectrum during the test of the connecting element being related to these reference magnitudes in order to obtain a measuring result for the stressing condition.

7. Process according to claim 6, comprising the step of: determining a numerical value which is in a functional relation to the area under the determined vibration spectrum and which is assigned a point on the stress-strain curve.

8. Process according to claim 7, comprising the step of: determining a numerical value which is in functional relation with the area of the magnetostrictive hysteresis curve and which is assigned a point on the stress-strain curve.

9. Process according to claim 8, comprising the step of: feeding an output signal obtained after evaluation into display means for displaying the measured value or is used for controlling screw means.

10. Process according to claim 9, comprising the steps of: measuring the frequency shift of individual lines of a spectrum in comparison with a reference spectrum and obtained as a measure for the strain of a connecting element.

11. Process according to claim 10, comprising the step of: measuring the amplitude change of individual lines of the spectrum in comparison with a reference spectrum and obtained as a measure for the stress in the connecting element.

12. Process according to claim 11, comprising the step of: obtaining the stress-strain curve by connecting the measured values of the frequency shift and the amplitude change.

13. Device for the non-destructive determination of a stressing condition of ferromagnetic connecting elements, said device comprising, an A.C. generator (21) of variable frequency,
a coil (19) connected with the A.C. generator (21) for generating a magnetic field in at least part of the connecting element (13),
an acoustic-electric sensor (23) abutable to the connecting element (13) for detecting any magnetostrictive or acoustic vibrations resulting from the generated magnetic field in at least part of the connecting element, and
signal processing and control means (25) for obtaining a signal representative of the magnetostrictive or acoustic vibrations detected from generating the magnetic field in at least part of the connecting element, and for evaluating the obtained signal resulting from the magnetostrictive or acoustic vibrations to determine the stressing condition of the ferromagnetic connecting elements.

14. Device according to claim 13, characterized by a D.C. generator (22) connected with the coil (19) for generating a D.C. magnetic field.

15. Device according to claim 14, characterized by a D.C. field coil (20) for generating a magnetic field in at least part of the connecting element (13), said D.C. field coil (20) being connected with a D.C. generator (22).

16. Device according to claim 15, characterized in that display means (27) for displaying the stressing condition in the connecting element (13) is connected with the evaluating circuit (25).

17. Device according to claim 16, characterized in that screw means (28) is connected with the evaluating circuit (25).

18. Device according to claim 17, characterized in that the coil (19 or 20) and the sensor (23) are arranged practically concentrically to each other.

19. Device according to claims 18, characterized in that the sensor (23) is mounted on a coupling element (26).

20. Device according to claim 19, characterized in that the coil (19 or 20) is disposed within the coupling element (26).

21. Device according to claim 20, characterized in that it is provided in the form of a rod-like hand device having a head (33) in which the coils (19 or 20) and the sensor (23) are accommodated.

22. Device according to claim 21, characterized in that the sensor (23) can be displaced axially in the head (33) against the force of a spring (37).

23. Device according to claim 22, characterized in that the alternating field coil (19) and the D.C. field coil (20) are essentially arranged concentrically to each other.

24. Device according to claims 12, characterized in that the D.C. field coil (20) is disposed essentially perpendicularly to the alternating field coil (19).

25. Device according to claim 24, characterized in that the D.C. field coil (20) is disposed on a coupling element (26), which coupling element (26) on the one hand transfers the measuring signals from the excitation site to the sensor (23) and on the other feeds the D.C. field flux into the connecting element (13) to be tested.

26. Device according to claim 25, characterized in that the coils (19, 20) are integrated in an automatic hand device.

* * * * *